United States Patent [19]

Kikuchi et al.

[11] Patent Number: 4,819,077

[45] Date of Patent: Apr. 4, 1989

[54] COLOR IMAGE PROCESSING SYSTEM

[75] Inventors: Katsuya Kikuchi, Nasu; Haruo Kato, Kuroiso, both of Japan

[73] Assignee: Kabushiki Kaisha Toshiba, Kawasaki, Japan

[21] Appl. No.: 38,830

[22] Filed: Apr. 15, 1987

[30] Foreign Application Priority Data

| May 14, 1986 | [JP] | Japan | 61-111627 |
| May 14, 1986 | [JP] | Japan | 61-111629 |
| May 14, 1986 | [JP] | Japan | 61-111630 |
| May 14, 1986 | [JP] | Japan | 61-111631 |

[51] Int. Cl.⁴ .................. H04N 11/00; A61B 1/04
[52] U.S. Cl. ........................... 358/98; 128/6; 358/11; 358/28; 358/80
[58] Field of Search ............ 358/98, 183, 28, 80, 358/22, 11; 128/6

[56] References Cited

U.S. PATENT DOCUMENTS

| 4,058,828 | 11/1977 | Ladd | 358/80 |
| 4,463,373 | 7/1984 | Mikami | 358/80 |
| 4,500,919 | 2/1985 | Schreiber | 358/80 |
| 4,525,736 | 6/1985 | Korman | 358/28 |
| 4,562,831 | 1/1986 | Murakoshi et al. | 128/6 |
| 4,608,598 | 8/1986 | Murakami | 358/183 |
| 4,633,303 | 12/1986 | Nagasaki | 358/98 |
| 4,663,657 | 5/1987 | Nagasaki | 358/98 |
| 4,667,229 | 5/1987 | Cooper | 358/98 |
| 4,679,072 | 7/1987 | Takayama | 358/80 |
| 4,716,457 | 12/1987 | Matsuo | 358/98 |
| 4,731,662 | 3/1988 | Udagawa | 358/80 |
| 4,737,842 | 4/1988 | Nagasaki | 358/98 |
| 4,768,089 | 8/1988 | Kato | 358/98 |

OTHER PUBLICATIONS

IBM J. Res. Develop. vol. 27, No. 4, Jul. 1983; E. J. Farrell; "Color Display and Interactive Interpretation of Three-Dimensional Data".

Primary Examiner—Howard W. Britton
Attorney, Agent, or Firm—Foley & Lardner, Schwartz, Jeffery, Schwaab, Mack, Blumenthal & Evans

[57] ABSTRACT

A color image processing system comprises a device for taking an image of an object, a first converting device for converting the image information obtained by the imaging device into red, green, and blue images, a second converting device for converting the red, green, and blue images into images representing intensity, saturation, and hue respectively, and a third converting device for converting the images representing the intensity, saturation, and hue into red, green, and blue images.

5 Claims, 8 Drawing Sheets

COLOR IMAGE PROCESSING SYSTEM

BACKGROUND OF THE INVENTION

1. Field of the Invention

The present invention relates to a color image processing system, and particularly to an image processing technique for an endoscopic system.

2. Description of the Prior Art

Recently, there has been developed an endoscopic system provided with a solid-state imaging element such as a charge coupled device (CCD) which is arranged at an end of a fiberscope of the endoscopic system. The fiberscope with the imaging element picks up the image of, for instance, an inside wall of a stomach as a color television image to directly display the image on a color CRT for observation. Admitted advantages of the endoscopic system with imaging element are (1) an endoscopic inspection carried out easily, and (2) an image to be displayed being clear. By processing and displaying the image obtained by the fiberscope with imaging element, it is expected to newly improve diagnostic functions.

According to a conventional image diagnosis with an endoscopic system, a morbidity is detected based on the structure (the irregularity of plicae) and the changes in color (coloring, color change, etc.,) of the mucosae of internal organs. In the case of an early cancer for instance, only a delicate change appears in the state of plicae so that the change in structure may not be recognized from observing a color image of the endoscope, and the morbidity may be overlooked.

In this case, if the delicate structure and the color change of the plicae are enhanced, the morbidity may be easily found. However, since the endoscopic image is generally represented by image information comprising three components of red (R), green (G), and blue (B) obtained by a color camera, there is a problem that the color is also changed when the enhancement for, for instance, the structure is carried out on the image comprising the components of R, G, and B.

As mentioned in the above, the conventional technique cannot carry out the enhancing process separately for the structure and for the color of the mucosae of internal organs.

Conventionally, in the image diagnosis with the endoscopic system, morbidity is inspected based on the structure (to be reflected by brightness) and the color change of the mucosae of internal organs. In this case, it is important to diagnose an extent of the morbidity.

When the color is changed delicately due to the morbidity, it is difficult to accurately recognize the color-changed morbid region by the diagnosis on the endoscopic color image.

Further, it is frequently difficult to recognize the delicate color change by the color image because the structure, i.e., an intensity affects the color. For instance, the same color is displayed dark for a distal location and bright for a proximal location. In the same manner, a valley of plicae is displayed dark, and a crest thereof bright. Due to those, it is difficult to observe the delicate tint of plicae.

According to a prior art color image processing system, no means is used to convert the image information comprising R, G, and B components into respective images for intensity, saturation, and hue which are three properties of color, process the respective images, convert the respective images again into the images of R, G, and B components, and display them.

SUMMARY OF THE INVENTION

In order to solve the problems of the prior art, an object of the present invention is to provide a color image processing system which can convert image information of the components of R, G, and B into respective images for intensity, saturation, and hue, process the respective images, and again convert the images into the images of R, G, and B components to display them.

Another object of the present invention is to provide an endoscopic system which can enhance only the delicate change in structure, or only a change in color, or both of them to find an abnormality of mucosae, etc., easily.

Still another object of the present invention is to provide an endoscopic system which can recognize a delicate change in color caused by a morbidity to greatly contribute to an early detection of the morbidity.

In order to accomplish the objects mentioned in the above, the present invention provides a color image processing system comprising a first converting means for converting red, green and blue images into respective images for intensity, saturation, and hue; an image enhancing process means for executing enhancing processes separately for one or more of the images of intensity, saturation, and hue; and a second converting means for converting the enhanced images of intensity, saturation, and hue into red, green, and blue images.

According to another embodiment of the present invention, an endoscopic system comprises an imaging means disposed in an inserting portion of a fiberscope of the endoscopic system; a first forming means for forming color images based on image information obtained by the imaging means; a second forming means for forming at least one of the images of hue, intensity, saturation based on the color images formed by the first forming means; and a display means for displaying the above-mentioned at least one image.

According to still another object of the present invention, an endoscopic system comprises an image converting means for converting color image information obtained by a fiberscope of the endoscopic system into the images of intensity, saturation, and hue; a threshold value setting means for setting threshold values for at least the hue; an image processing means for processing one or more of the images of intensity, saturation, and hue, pixels inside the threshold values of the image to be processed being processed differently from pixels outside the threshold values of the image to be processed; and a display means for displaying the processed image according to the information of intensity, saturation, and hue processed by the image processing means.

BRIEF DESCRIPTION OF THE DRAWINGS

The other objects, features and advantages of the present invention will become apparent from the following descriptions of the preferred embodiments taken in conjunction with the accompanying drawings in which.

DETAILED DESCRIPTION OF THE EMBODIMENTS

The embodiments of the present invention will be described with reference to the accompanying drawings.

Figure 1:
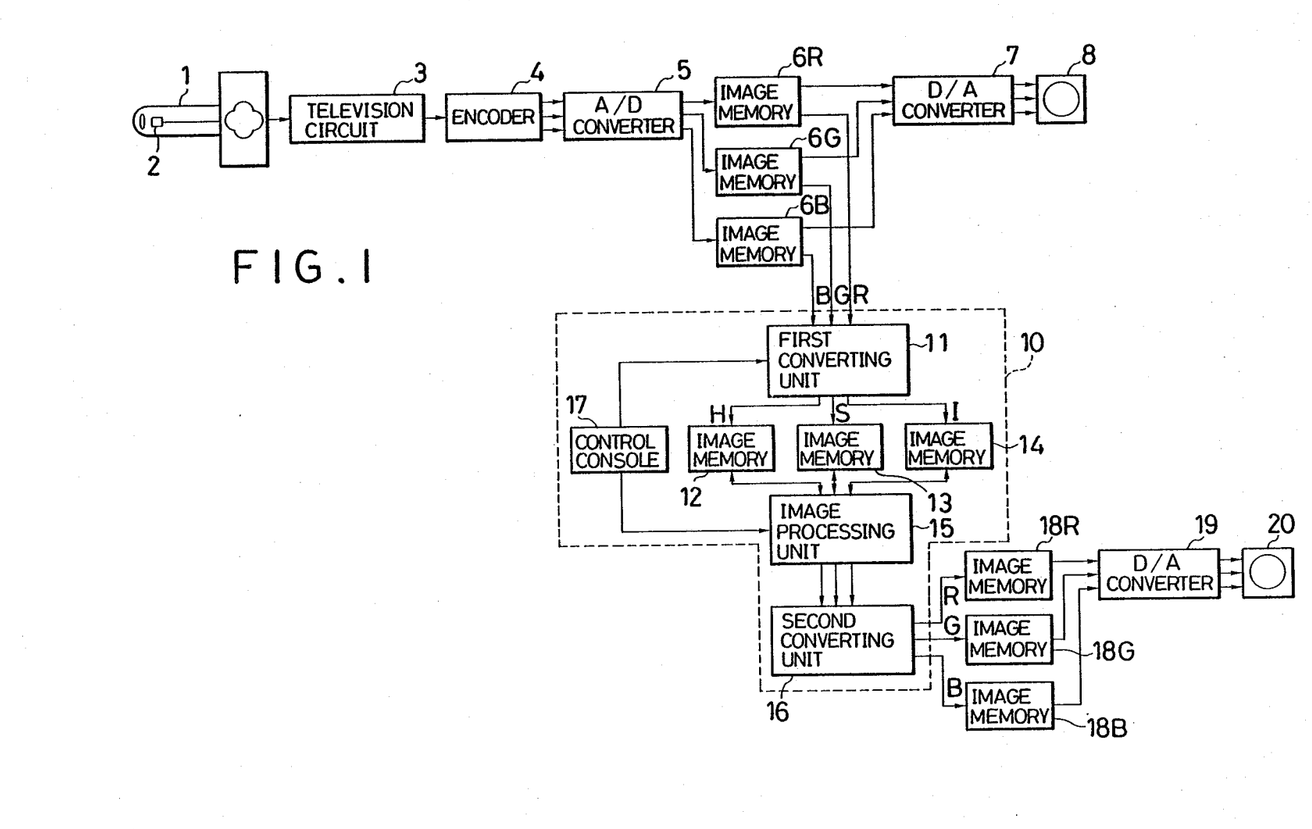
FIG. 1 is a block diagram showing an embodiment of the present invention.

FIG. 1 is a block diagram showing an endoscopic system according to the present invention. In the figure, a numeral 1 represents a fiberscope provided with a solid-state imaging element 2 which is a charge coupled device (CCD) disposed at an end of the fiberscope 1, and 3 a television circuit portion for generating color video signals from signal outputs of the CCD 2. To generate the color video signals, there may be adopted a plane sequential method for forming images sequentially on the CCD 2 by the light of red (R), green (G), and blue (B) having different wavelengths respectively, or a simultaneous method for forming a mosaic filter on the CCD 2 to obtain the information of R, G, and B simultaneously.

A numeral 4 represents an encoder for converting the color video signals into R, G, B signals; 5 an A/D converter for A/D-converting the R, G, and B signals from the encoder 4; and 6R, 6G and 6B are image memories for red, green, and blue images. A numeral 7 represents a D/A converter for D/A-converting the digital signals of R, G, and B from the image memories 6R, 6G, and 6B into analog signals; and 8 a display for displaying images according to the analog signals from the D/A converter 7.

The arrangement mentioned in the above is for a prior art unit which converts an original image obtained by the fiberscope 1 into R, G, and B images to display the images on the display 8. According to the present embodiment, the original image display unit is connected to a processed image display unit with the below-mentioned constitution to realize separate enhancing processes for structure and for color respectively.

Figure 2:
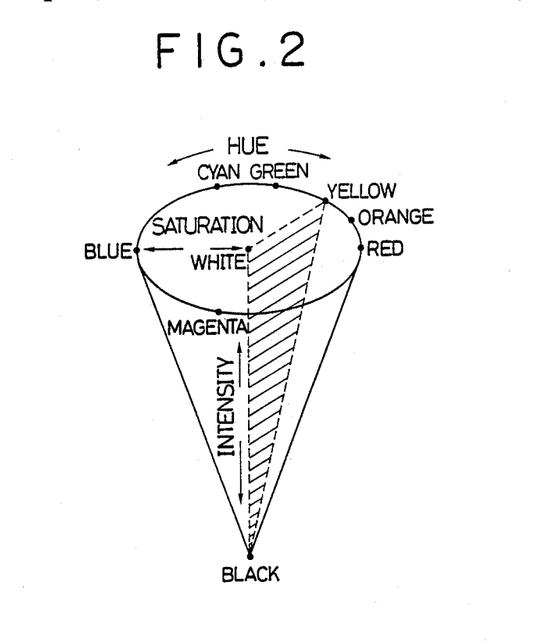
FIG. 2 is a schematic view showing the relationship between the three properties of color.

A first converting unit 11 which is a first image converting means receives the R, G, and B signals from the image memories 6R, 6G, and 6B, and converts the signals into respective images for intensity (I), saturation (S), and hue (H) which are three properties of color. The relationship between the three properties of color is shown in FIG. 2 schematically. As shown in the figure, the intensity (I) is the black and white information of an original image (corresponding to brightness information quantitatively) to show the structure of the inside walls of internal organs well. The saturation (S) represents the vividness (a degree to be diluted by white) of respective colors of the original image. The hue (H) is a tint such as red, blue, etc., of the original image and can be expressed by a wavelength. As a method known in a color graphic field for converting the H, S, and I signals into the R, G, and B images, there is, for instance, an HSI converting model proposed by ACM (the Association for Computer Machinery)—SIGGRAPH (Special Interest Group on Computer Graphics) in U.S.A. in 1979.

A numeral 10 represents an image enhancing process means for executing an enhancing process separately for the respective H, S, and I images, provided with image memories 12, 13, and 14 for storing the H, S, and I images respectively, an image processing unit 15, and a control console 17. The control console 17 is disposed on a grip portion of the fiberscope 1 to output a converting command to the first converting unit 11 in response to an input by an operator, as well as outputting an enhancing process command to the image processing unit 15. The image memories 12, 13, and 14 store the H, S, and I images respectively converted by the first converting unit 11, and, after that, store images enhanced by the image processing unit 15. The image processing unit 15 receives the H, S, and I images from the image memories 12, 13, and 14 in response to a command from the control console 17, executes the imaging process separately for the respective images, and stores the processed images into the image memories 12, 13, and 14 respectively.

The second converting unit 16 which is a second image converting means receives the H, S, and I images which have been enhanced and stored in the image memories 12, 13, and 14, and converts the images into R, G, B images.

For displaying the R, G, and B images formed by the second converting unit 16, there are arranged image memories 18R, 18G, and 18B, a D/A converter 19, and a display 20.

The operation of the system with the above arrangement will be next described.

Firstly, the fiberscope 1 is inserted into the body of a patient to irradiate light onto, for instance, the inside wall of the stomach. Light reflected from the inside wall is detected by the CCD 2 and converted into electric signals. The television circuit 3 forms standard video signals such as NTSC signals based on the electric signals. The NTSC signals are converted into R, G, and B signals by the encoder 4, converted into digital signals by the A/D converter 5, and stored in the image memories 6R, 6G, and 6B. The R, G, and B signals stored in the image memories 6R, 6G, and 6B are converted into analog signals by the D/A converter 7 to display an original image on the display 8 with color. Thus, a general image diagnosis of the inside wall of the stomach is realized.

If it is required to diagnose the fine structure of the plicae of the inside wall of the stomach more accurately, the following image enhancing process will be carried out.

Firstly, according to an input operation of the operator, an image process executing command is outputted from the control console 17 to the first converting unit 11. Then, the first converting unit 11 inputs into itself the R, G, and B signals from the image memories 6R, 6G, and 6B to convert the signals into H, S, and I images according to a known RGB-to-HSI converting method, and outputs the converted signals. The H, S, and I images are stored in the image memories 12, 13, and 14.

On the other hand, the control console 17 outputs, according to an input operation of the operator, a structure enhancing command to the image processing unit 15. Then, the image processing unit 15 carries out a band-pass filtering process such as the one shown in FIG. 3 with respect to the intensity (I) image stored in the image memory 14.

The filter-processed I image is again stored in the image memory 14. After that, the not-processed H and S images in the image memories 12 and 13, and the filter-processed I image in the image memory 14 are inputted into the second converting unit 16, and converted into R, G, and B images. After that, the R, G, and B images are once stored in the image memories 18R, 18G, and 18B, converted into analog signals by the D/A converter 19, and displayed on the display 20.

Comparing the color image displayed on the display 20 with the original color image displayed on the display 8, the image on the display 20 has the intensity (I) processed by the band-pass filtering so that the image may be enhanced only in the structure of the plicae of the stomach inside wall, with the color tone of the original image information as it is. Therefore, without losing the color tone, only the structure of plicae can be subjected to the enhancing process to realize the diagnoses of a delicate change of the plicae.

Figure 3:
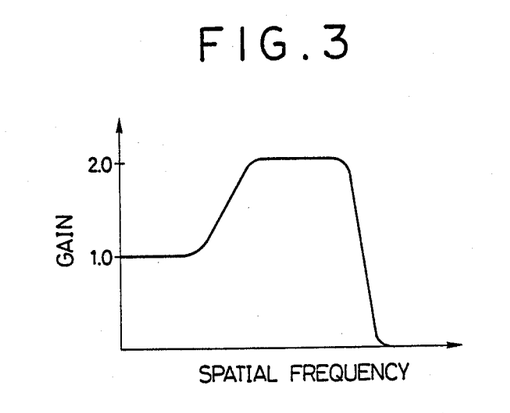
FIG. 3 is a view showing a band-pass filter characteristic as an example of an enhancing process.

In the same manner as that mentioned in the above, the band-pass filtering process shown in FIG. 3 may be executed only on the saturation (S) of an image. In this case, the control console 17 outputs a saturation enhancing command to the image processing unit 15. Then, the image processing unit 15 executes the band-pass filtering process only on the saturation (S) image in the image memory 13 so that an image to be displayed on the display 20 may be an image with the enhancement carried out on changes related only to the saturation.

Such an enhancing process is applicable in various ways. For instance, the mucosae of the stomach is generally red, and a morbid portion thereof is frequently observed with more red so that the above-mentioned filtering process may enhance the red portion further in red to improve the diagnostic capacity.

When the color of the morbid portion is changed, the filtering process may be carried out on a saturation (S) image to obtain an image with the color changed portion enhanced.

Since the enhancing process of image can be carried out separately for the respective H, S, and I images, and not only for one of the three images as in the described two cases, but also for two or more of the three images.

For instance, the intensity (I) image and saturation (S) image in the image memories 14 and 13 may be subjected to the filtering process. In this case, a hybrid result of the combination of the images obtained by the above two processing examples will be displayed.

Figure 4:
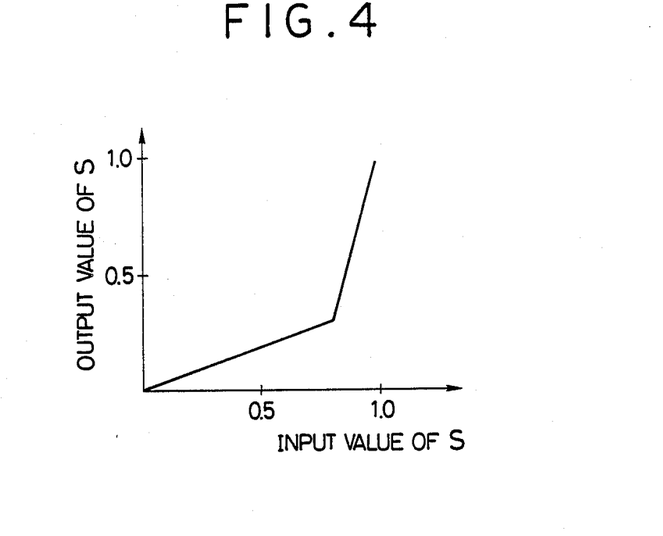
FIG. 4 is a view showing a window characteristic as an example of the enhancing process.
Figure 5:
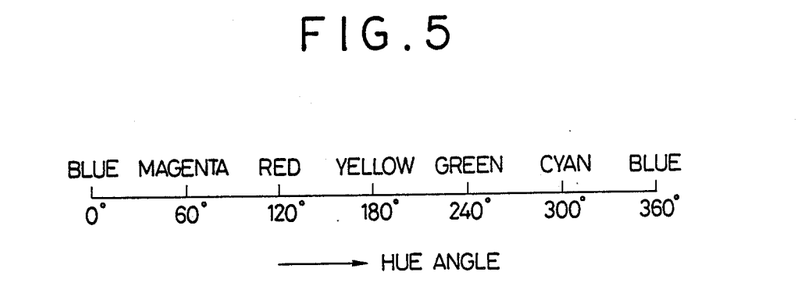
FIG. 5 is a schematic view showing hue angles as an example for expressing the hue.

As a modification of the enhancing process, not only the filtering process but also various enhancing processes contributing to the improvement of diagnostic capacity may be adopted. For instance, in enhancing the saturation (S) image, a non-linear gain conversion (window process) shown in FIG. 4 may be carried out on the S image. In this case, an effect is expected that red portions, the image of blood vessels will be enhanced.

In this way, various examples for the enhancing process may be considered. When enhancing process will be executed with respect to a certain image, the operator may select an image through the control console 17, and the image processing unit 15 may be provided with various processing functions corresponding to various enhancing processes.

As an application of the present invention, the images for intensity, saturation, and hue which are the three properties of color obtained by the first converting means 11 may be treated by a numerical analysis to display the result on a display, or to output the result to a recording unit.

As described in the above in detail, according to the present invention, the structure or the color of an endoscopic color image can be subjected to an enhancing process separately from each other so that there will be provided an endoscopic system which has a high diagnostic capacity and easily detects the abnormality of mucosae, etc.

The image enhancing process may be interlocked with a freeze switch for freezing a diagnostic objective image when it is displayed to carry out various enhancing processes on the frozen image. An embodiment with the freeze switch may be described below in connection with a hue enhancing process.

In FIG. 1, the image processing unit 15 receives the H, S, and I information from the image memories 12, 13, and 14, fixes the data of intensity (I) and saturation (S) to, for instance, I=0.5 and S=0.5, and outputs all the information with the hue information as it is.

The control console 17 outputs, according to an input of the operator, a converting command to the first converting unit 11, as well as outputting an image processing command to the image processing unit 15. These commands will be carried out after pushing an image freezing switch (not shown) provided on the control console 17 to freeze a color image displayed on the display 8.

When it is required to diagnose changes in color due to a morbidity of the stomach inside wall more accurately, the following imaging process will be carried out.

Firstly, the operator pushes the freezing switch on the control console 17 to freeze an image displayed on the display 8 to specify an image to be processed. After that, according to an input operation of the operator, the control console 17 outputs an image processing execution command to the first converting unit 11. Then, as described in the above, the first converting unit 11 inputs R, G, and B signals from the image memories 6R, 6G, and 6B, converts the signals into H, S, and I images, and outputs the images. The H, S, and I images are stored in the image memories 12, 13, and 14.

When the control console 17 outputs a hue image forming command to the image processing unit 15, the image processing unit 15 inputs the H, S, and I images from the image memories 12, 13, and 14, processes the images with I=0.5 for the intensity and S=0.5 for the saturation, and outputs the images with the hue (H) image as it is.

The second converting unit 16 converts the processed H, S, and I images into R, G, and B images again and outputs the R, G, and B images. After that, the R, G, and B images are stored in the image memories 18R, 18G, and 18B temporarily, converted into analog signals by the D/A converter 19, and displayed on the display 20.

Comparing the image displayed on the display 20 with the image displayed on the display 8, the image displayed on the display 20 is processed with S=0.5 and I=0.5 at the time of conversion into the H, S, and I images. Therefore, with respect to the intensity (I) and saturation (S), there are no changes between pixels of the image. Namely, the image on the display 20 is an image only with the hue (H) as information. Accordingly, the influence on intensity due to the distance of the diagnosed portion and the irregularity of plicae, and the influence on saturation which is a difference of the vividness of the same color will not affect the image. As a result, the displayed image is a clear hue image so that a delicate color change may easily be recognized. Therefore, a morbidity causing the delicate color change can be recognized to realize an early detection of the morbidity.

As a hue image forming means, not only the one adopted for the above-mentioned embodiment but also various means for forming a hue image based on at least the color image information from the solid-state imaging element 2 can be adopted. The first converting unit 11 of the above embodiment converts R, G, and B signals into H, S, and I signals to form the hue image. For instance, in a method for displaying an endoscopic color image based on television signals such as NTSC signals from the television circuit 3, the hue image forming means may convert the signals into R, G, and B signals, and the processes which are the same as those of the above embodiment may be carried out to form the hue image.

Figure 6:
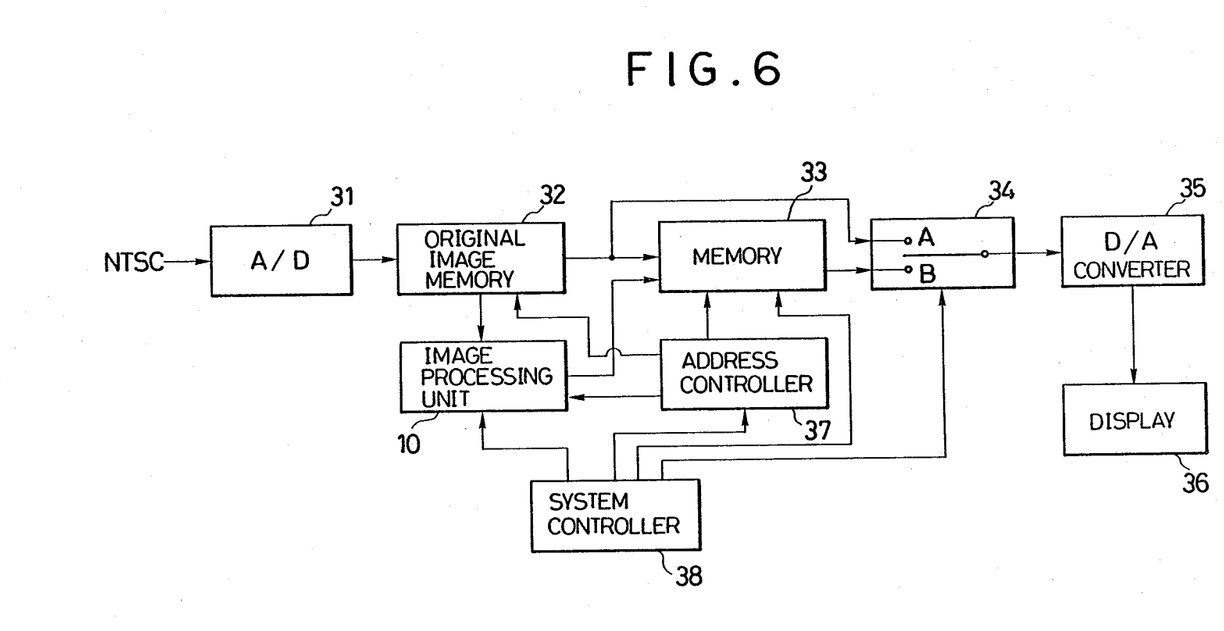
FIG. 6 is a block diagram showing a modification of the present invention provided with a common display means.

In the above embodiment, the display means 6, 5, and 8 for an endoscopic color image and the display means 18, 19, and 20 for a hue image are provided separately. However, as shown in FIG. 6, a D/A converter 35 and a display 36 may commonly be used as a display means through the switching operation of a selector 34 to display the above two images selectively one or the other on the display 36, or to display the two images on the one display plane dividedly.

To do this, color imaging signals such as NTSC signals from a fiberscope are converted into digital signals by an A/D converter 31 to store an original image in an image memory 32. When the original image is displayed, the selector 34 is switched to an "A" terminal to display the original image. On the other hand, a hue image is formed by an image processing unit 10. When the hue image is only displayed, the hue image is stored in a memory 33 temporarily, and displayed through a "B" terminal of the selector 34. To display both images on the same plane of the display 36 dividedly, the original image and the hue image are written into the memory 33. At this time, the two images are compressed as data, and, therefore, an address controller 37 thins the data and writes the data into two regions of the memory 33 corresponding to, for instance, the left and right halves of the display 36. After that, the selector 34 may select the B terminal to display both images on the display 36 dividedly. The address control and the switching control of selector 34 mentioned in the above are carried out according to commands from a system controller 38.

As described in the above in detail, according to this embodiment, a hue image is formed and displayed according to color image information from a solid-state imaging element, and, with such a hue image, a pure color change not affected by the irregularity of the structure of a diagnosed part can be detected to observe a delicate color change caused by a morbidity, thereby greatly contributing to an early detection of the morbidity.

Figure 7:
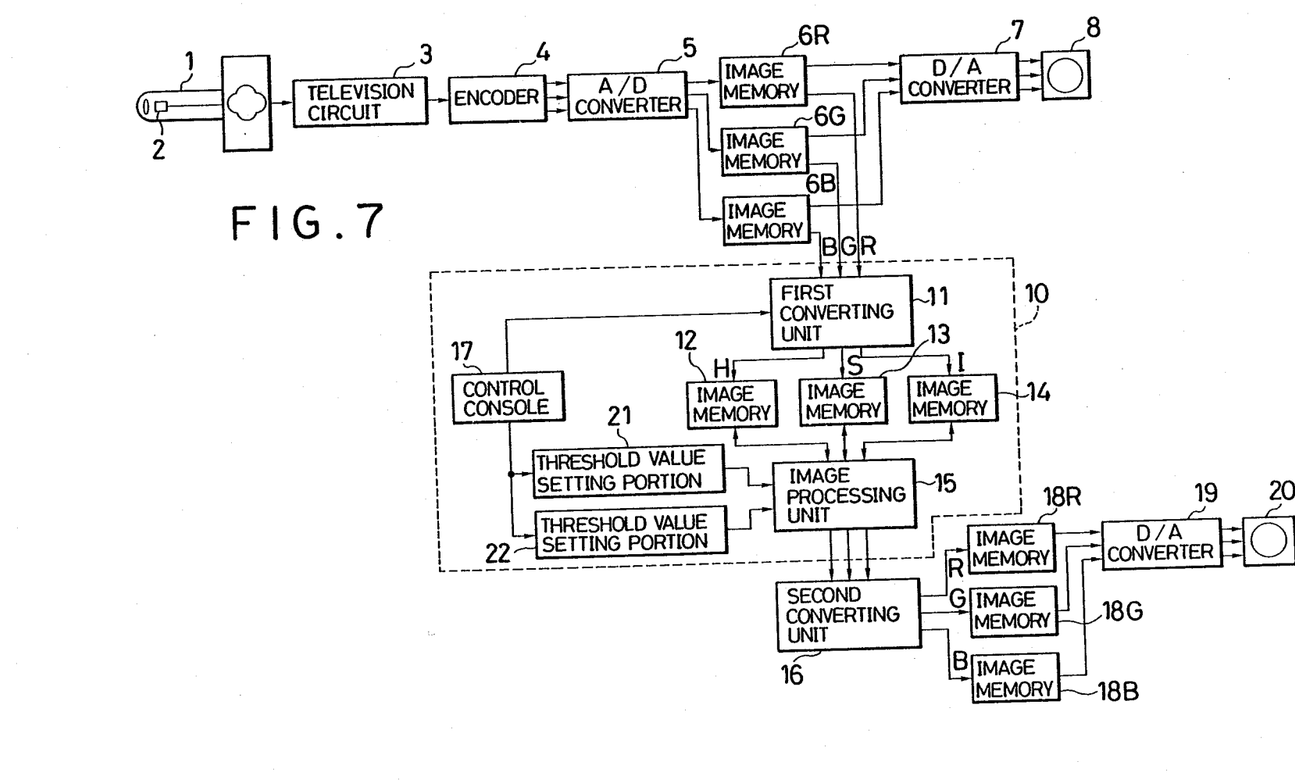
FIG. 7 is a block diagram showing a system according to another embodiment of the present invention.

FIG. 7 is a block diagram showing an endoscopic system according to another embodiment of the present invention.

Figure 8:
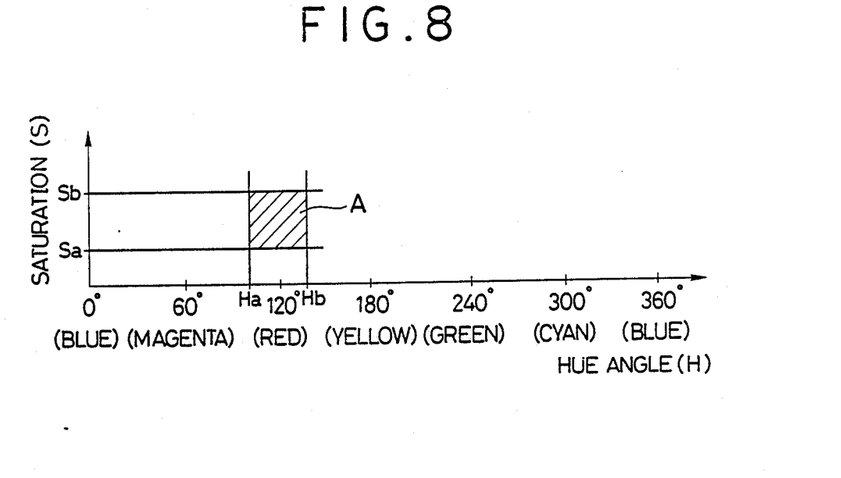
FIG. 8 is a schematic view showing threshold values for the hue and saturation.

In this embodiment, an intensity (I) and a saturation (S) are changed to values of 0 to 1, and a hue (H) is expressed as a hue angle as shown in FIG. 8.

A control console 17 outputs, according to an input operation of an operator, a converting command to a first converting unit 11, as well as outputting image processing commands to threshold value setting portions 21 and 22 to be described later. These commands may be outputted after pushing an image freezing switch (not shown) disposed on the control console 17 to stop a color image displayed on a display 8.

As a threshold value setting means, in this embodiment, there are provided the threshold value setting portion 21 for setting threshold values for the hue, and the threshold value setting portion 22 for setting threshold values for the saturation. The threshold value setting portions 21 and 22 may be constituted by, for instance, ROMs to read out predetermined threshold values in response to commands from the control console 17. As the threshold value setting means, it is possible to use devices whose threshold values are directly inputted by the operator.

Examples of parameters of the threshold values for the hue set by the threshold value setting portion 21 are Ha and Hb (Ha<Hb) shown in FIG. 8, and examples of parameters of the threshold values for the saturation set by the threshold value setting portion 22 are Sa and Sb (Sa<Sb) shown in FIG. 8.

An image processing unit 15 as an image processing means receives H, S, and I images from memories 12, 13, and 14 and the threshold values Ha, Hb, Sa, and Sb from the threshold value setting portions 21 and 22, and executes different processes for one or more images out of the intensity (I), saturation (S), and hue (H) images depending on whether pixels of the image to be processed are within the threshold values (pixels with values of Ha<H<Hb and Sa<S<Sb) or outside the threshold values. In this embodiment, the pixels outside the threshold values are processed to be an achromatic color with saturation S=0, and the other pixels are outputted as they are without being processed.

As means for displaying the processed images according to the H, S, and I images outputted from an image processing portion 10, there are disposed a second converting unit 16, image memories 18R, 18G, and 18B, a D/A converter 19, and a display 20.

In the system with the above arrangement, the following image processing is carried out to diagnose changes in color caused by a morbidity of the stomach inside wall more accurately.

Firstly, an operator pushes a freezing switch of the control console 17 to freeze an image displayed on the display 8 to specify an image to be processed. Then, according to an input operation of the operator, the control console 17 outputs an image processing execution command to the first converting unit 11. Then, the first converting unit 11 inputs R, G, and B signals from the image memories 6R, 6G, and 6B, converts the signals into H, S, and I images, and outputs the images. The H, S, and I images are stored in the image memories 12, 13, and 14.

The control console 17 outputs signals for setting threshold values to the threshold value setting portions 21 and 22. The threshold value setting portion 21 and 22 output the hue threshold values Ha and Hb and the saturation threshold values Sa and Sb shown in FIG. 8.

After that, the image processing unit 15 executes no processes with respect to pixels having values of Ha<H<Hb and Sa<S<Sb (corresponding to a region "A") to keep original image information as it is to output chromatic information, and executes a converting process with S=0 for the other pixels having values other than those mentioned in the above to output achromatic information.

The second converting unit 16 converts the processed H, S, and I images into R, G, and B images again to output the same. After that, the R, G, and B images are stored in the image memories 18R, 18G, and 18B temporarily, converted into analog signals by the D/A converter 19, and displayed on the display 20.

Comparing the image displayed on the display 20 with the image displayed on the display 8, the image displayed on the display 20 has been subjected to the process for making the pixels outside the threshold values to be achromatic at the time of conversion into the H, S, and I images. Namely, if the threshold values are set for a region whose color has been changed due to a morbidity, only the morbidity region is displayed as a chromatic image, and the other regions as achromatic images. Therefore, the extent of the morbid region can easily be recognized.

If a region to be diagnosed is the stomach mucosae whose image is generally reddish, the color will be more reddish or faded when it is affected by the morbidity. In this case, the parameters Ha and Hb may be set in the vicinity of the hue of red as shown in FIG. 8.

The image processing operation by the image processing unit 15 is not limited to the one described in the above embodiment. For instance, the display colors of pixels having the hue values of Ha<H<Hb and the saturation values of Sa<S<Sb may be changed to pseudo colors by processing the pixels with, for instance, the hue value of red and the saturation value of 1, and the other pixels may keep original image information with no changes on them. As a result of this process, a morbid region is displayed with real red, and the other regions stay in their original images so that the diagnosis of the morbid region may easily be carried out.

Figure 9:
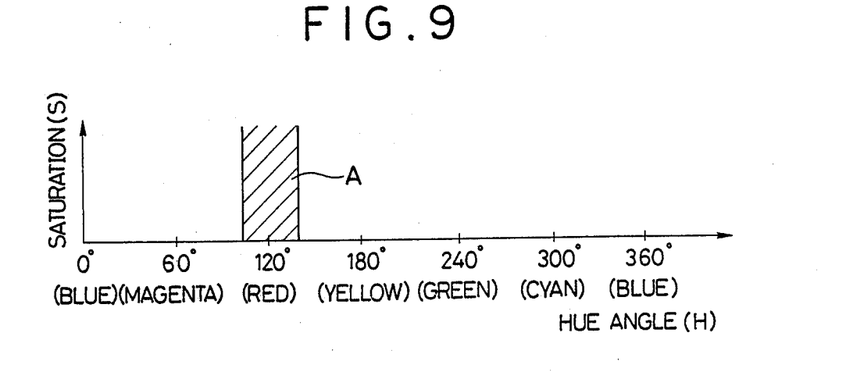
FIG. 9 is a schematic view showing threshold values for the hue.

In the above embodiment, the threshold values have been set for both the hue and saturation. According to the present invention, however, the process which makes a morbid region to be easily recognized can be performed if the threshold values are set for at least the hue as shown in FIG. 9. Therefore, the threshold value setting portion 22 may be omitted.

Further the image converting means is not limited to the one described in the above embodiment, but various means which can convert color image information from the solid-state imaging element 2 into H, S, and I images are adoptable. In the first converting unit 11 in the above embodiment, R, G, and B signals are converted into H, S, and I images to form a hue image. In a method for displaying an endoscopic color image based on television signals such as NTSC signals from the television circuit 3, the image converting means may convert the signals into R, G, and B signals, and then a process similar to the one described in the above embodiment may be carried out to form processed images.

In the above embodiment, the display means 6, 7, 8 for displaying an endoscopic color image and the display means 16, 18, 19, and 20 for displaying a processed image are provided separately. As described with reference to FIG. 6, the D/A converter 35 and the display 36 can be used commonly as a display means through the switching operation of the selector 34 to display both images on the display 36 selectively one or the other, or to display both images on one display plane dividedly.

According to this embodiment, the images of intensity (I), saturation (S), and hue (H) are once formed according to color image information from a solid-state imaging element, and threshold values for the hue are set such that the threshold values correspond to at least a morbid region. Pixels of one or more of the images of intensity, saturation, and hue are processed differently depending on whether the pixels are inside the threshold values or outside the threshold values. As a result, a region whose color has been changed due to a morbidity can easily be recognized, thereby presenting an endoscopic system with a high diagnostic capacity.

Figure 10:
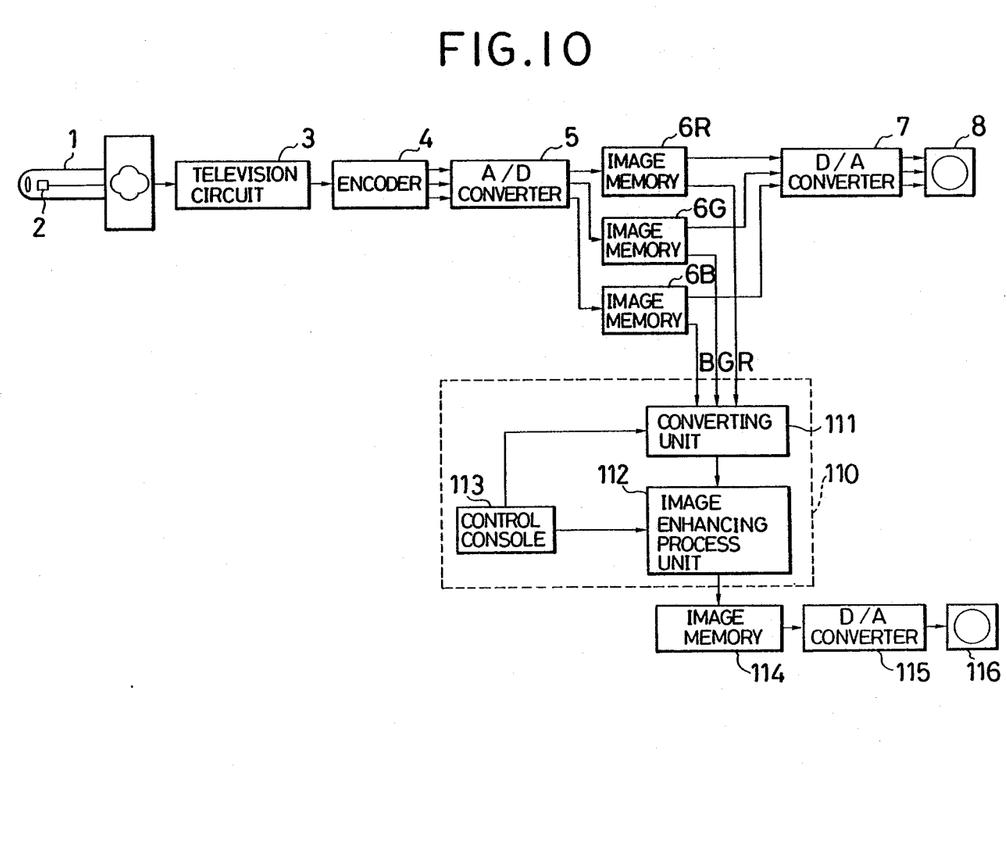
FIG. 10 is a block diagram showing a system according to still another embodiment of the present invention.

FIG. 10 is a block diagram showing an endoscopic system according to still another embodiment of the present invention. In this embodiment, an original image displaying unit is connected to a processed image displaying unit with the following arrangement to display an intensity image (a black and white image) in which the structure of a region to be diagnosed is only enhanced.

A numeral 110 represents an image processing unit comprising an image converting unit 111 as an intensity image forming means, an image enhancing process unit 112 as an image enhancing process means, and a control console 113.

The image converting unit 111 receives R, G, and B signals from image memories 6R, 6G, and 6B to convert the signals into an intensity (I) image which is one of the three properties of color. The intensity (I) image is black and white information (quantitatively, corresponding to brightness information) of the original image to show the structure of the walls of internal organs very well. As an example of a method for forming the intensity (I) image from the R, G, and B signals, the following operational formula is executed:

$$I = 0.2988R + 0.5868G + 0.1144B \qquad (1)$$

The control console 113 is disposed, for instance, at a grip portion of a fiberscope to output a converting command to the image converting unit 111 according to an input operation of an operator, as well as outputting an image enhancing process command to the image enhancing process unit 112. The above commands may be executed after pushing an image freezing switch (not shown) arranged on the control console 113 to stop a color image displayed on a display 8. The image enhancing process unit 112 executes, according to the command from the control console 113, an enhancing process such as a band-pass filtering process with respect to the intensity (I) image from the image converting unit 111.

As a means for displaying the enhancement-processed intensity (I) image, there are provided an image memory 114, a D/A converter 115, and a display 116.

For instance, the following image process is carried out when the structure of the fine mucosae of the stomach inside wall is diagnosed more accurately.

Firstly, the operator pushes the freezing switch on the control console 113 to freeze an image displayed on the display 8 to specify an image to be processed. After that, according to an input operation by the operator, the control console 113 outputs an image processing execution command to the image converting unit 111. Then, the image converting unit 111 inputs R, G, and B signals from the image memories 6R, 6G, and 6B, and executes the operation of formula (1) to convert the R, G, and B signals into an intensity (I) image.

Further, according to an input operation by the operator, the control console 113 outputs a structure enhancing command to the image enhancing process unit 112. Then, the image enhancing process unit 112 executes the band-pass filtering process shown in FIG. 3 on the intensity (I) image from the image converting unit 111.

The filter-processed intensity image is once stored in the image memory 114, converted into analog signals by the D/A converter 115, and displayed as a black and white variable density image on the display 116.

Comparing the black and white variable density image displayed on the display 116 with the original color image displayed on the display 8, the image on the display 116 can reflect the structure of the stomach inside wall very well because it is the black and white variable density image. Therefore, it is possible to observe delicate changes in the state of mucosae in an early cancer, etc., without overlooking the same. Further, the black and white variable density image is an enhancement-processed image with the band-pass filtering by the image enhancing process unit 112 so that the morbidity can correctly be diagnosed.

The intensity forming means is not limited to the one described in the above embodiment. Various means which can form an intensity image according to color image information from the solid-state imaging element 2 may be adopted. In the image converting unit 111 of the above embodiment, the intensity image has been formed from R, G, and B signals by executing the formula (1). In a method for displaying an endoscopic color image based on television signals such as NTSC signals from the television circuit 3, the signals may be converted into R, G, and B signals by the intensity image forming means, and then the intensity image is formed according to the formula (1).

Figure 11:
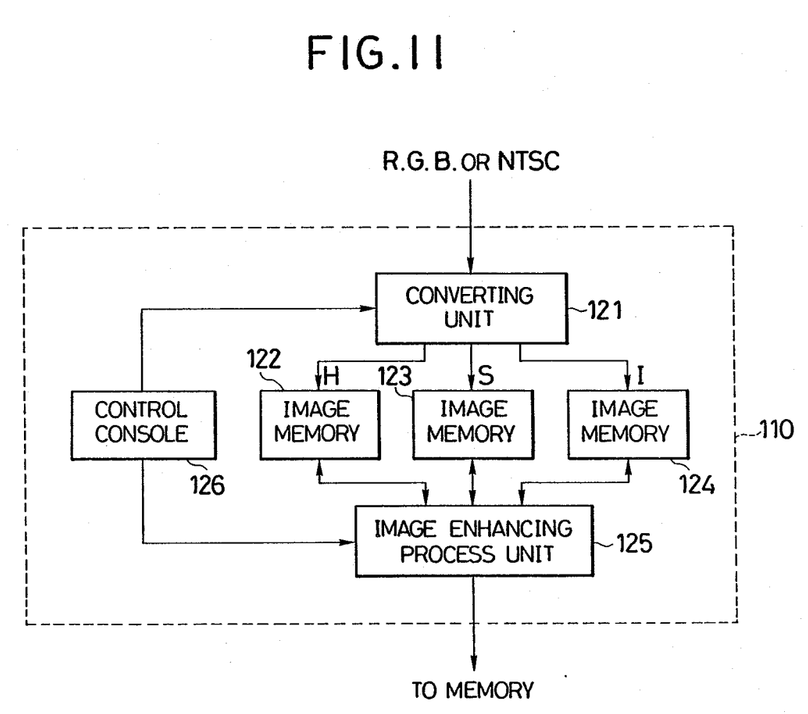
FIG. 11 is a block diagram showing a modification of an image processing unit according to the present invention.

Further, as another method for forming an intensity image, the constitution shown in FIG. 11 may be adopted. A converting unit 121 shown in FIG. 11 is a unit for converting R, G, and B signals into the images of intensity (I), saturation (S), and hue (H), and corresponds to the unit 11 shown in FIG. 1. If the input signals are NTSC signals, the signals are converted into R, G, and B signals, and then converted into H, S, and I images.

The H, S, and I images are once stored in image memories 122, 123, and 124. After that, only the intensity (I) image is subjected to an enhancing process by an image enhancing process unit 125 according to a command from a control console 126. At this time, the image is inputted with S=0 to realize the enhancing process for the intensity (I) image because the color information is not considered.

In the above embodiment, the display means 6, 7, and 8 for displaying an endoscopic color image and the means 114, 115, and 116 for displaying an intensity image have been provided separately. As described with reference to FIG. 6, the D/A converter 35 and the display 36 can be used commonly as a display means through the switching operation of the selector 34 to display both images on the display 36 selectively one or the other, or to display both images on the same display plane dividedly. Further, the present invention can be applied to a system in which a television camera is connected to an eye piece portion of the fiberscope 1.

The intensity image is formed in the image processing unit 110. To display the intensity image only, the image is once stored in the memory 33, and displayed through the B terminal of the selector 34. To display the both images on the same plane of the display 36 dividedly, the original image and the intensity image are written into the memory 33. The other constitution and operation are the same as those explained with reference to FIG. 6.

As described in the above in detail, according to this embodiment, an intensity image is formed based on color image information from a solid-state imaging element, and is enhanced and displayed. Accordingly, a structure enhanced image can be displayed. As a result, delicate changes in the state of the structure can be observed, greatly contributing to the early detection of the morbidity.

What is claimed is:

1. An endoscopic system comprising:
   imaging means disposed in a scope portion of an endoscope, for taking an image of an object;
   first formation means for forming first color images of red, green, and blue, the image obtained by said imaging means;
   second formation means for forming at least one second color image of hue, intensity, and saturation based on the first color images formed by said first formation means; and
   display means for displaying at least one of the first color images.

2. An endoscopic system as claimed in claim 1, wherein said display means dividedly displays said first color image and at least the one second color image on the same display surface.

3. An endoscopic system, comprising:
   imaging means arranged in a scope portion of an endoscope, for taking an image of an object;
   first formation means for forming first color images of red, green and blue, based on the image obtained by the imaging means;
   second formation means for forming at least one second color image of hue, saturation and intensity based on the first color images formed by the first formation means;
   display means for displaying at least the one second color image;
   setting means for setting upper and lower threshold values for at least one of the hue, saturation and intensity; and
   image processing means for differently processing pixels inside the threshold values set by the setting means and pixels outside the threshold values in at least one of the hue, saturation and intensity, the image processed by the image processing means being displayed by the displayed means.

4. An endoscopic system as claimed in claim 4, wherein said image processing means processes the saturation so that the pixels outside said threshold values may be achromatic colors.

5. An endoscopic system as claimed in claim 3, wherein said image processing means processes the hue and saturation so that the pixels inside said threshold values may be pseudo colors.

* * * * *